United States Patent [19]

Janelle et al.

[11] Patent Number: 5,724,902
[45] Date of Patent: Mar. 10, 1998

[54] MINIMUM TILLAGE SEEDING DEVICE

[75] Inventors: Luc Janelle, St-Germain; Claude Laguë, Québec; Sylvio Tessier, Pont Rouge, all of Canada

[73] Assignee: Université Laval of Cité Universitaire, Quebec, Canada

[21] Appl. No.: 212,901

[22] Filed: Mar. 14, 1994

[51] Int. Cl.$^6$ ....................................... A01C 5/00
[52] U.S. Cl. .............. 111/164; 111/924; 111/194; 172/575
[58] Field of Search ................... 111/164, 194, 111/165, 69, 163, 191, 196, 923, 924, 139, 192, 193; 172/575, 574, 584, 603

[56] References Cited

U.S. PATENT DOCUMENTS

| | | | |
|---|---|---|---|
| 522,329 | 7/1894 | Packham | 111/194 X |
| 526,436 | 9/1894 | Campbell | 111/165 X |
| 605,348 | 6/1898 | Schultz | 111/165 X |
| 736,963 | 8/1903 | Ham | 111/165 |
| 4,044,697 | 8/1977 | Swanson | 111/165 X |
| 4,141,302 | 2/1979 | Morrison, Jr. et al. | 111/164 X |
| 4,760,806 | 8/1988 | Bigbee et al. | |
| 4,762,075 | 8/1988 | Halford | 111/194 X |
| 4,765,263 | 8/1988 | Wilkins | |
| 4,920,901 | 5/1990 | Pounds | 111/194 X |
| 4,930,431 | 6/1990 | Alexander | 111/164 |
| 4,977,841 | 12/1990 | Trvax | 111/164 X |
| 5,025,736 | 6/1991 | Anderson | |
| 5,074,227 | 12/1991 | Schwitters | 111/164 X |

Primary Examiner—Terry Lee Melius
Assistant Examiner—Victor Batson
Attorney, Agent, or Firm—Klauber & Jackson

[57] ABSTRACT

A seeding device principally for no-tillage seeding conditions comprises a drag arm carrying two disk blades and transmitting the necessary forces thereto to cut through crop residues at the ground surface and to open a furrow for seed placement in the soil. The smaller disk is oriented vertically, whereas the larger disk extends at a compound angle from a lower front contact point between the two disks which thus define a V-shaped opener. The larger disk is angled relative to both the direction of travel and to a vertical axis to cut through residues and the soil and to displace a volume of soil for forming a trench. The smaller disk retains soil on a side of the furrow to allow a tube to deliver seeds therein. The smaller blade can also cut residues at the point of contact between the two disks to avoid trash buildup thereat. A depth control wheel which follows the ground surface in order to maintain the disk blades at a constant depth during furrow opening can be adjusted to obtain various seed depths in the soil. At the rear end of the seeding device, a press wheel closes the furrow by replacing the disturbed soil into it and firms the soil around the seeds. The press wheel can be spring biased towards the ground and the spring force adjusted so that the press wheel exerts the appropriate pressure on the soil surrounding the seeds.

20 Claims, 3 Drawing Sheets

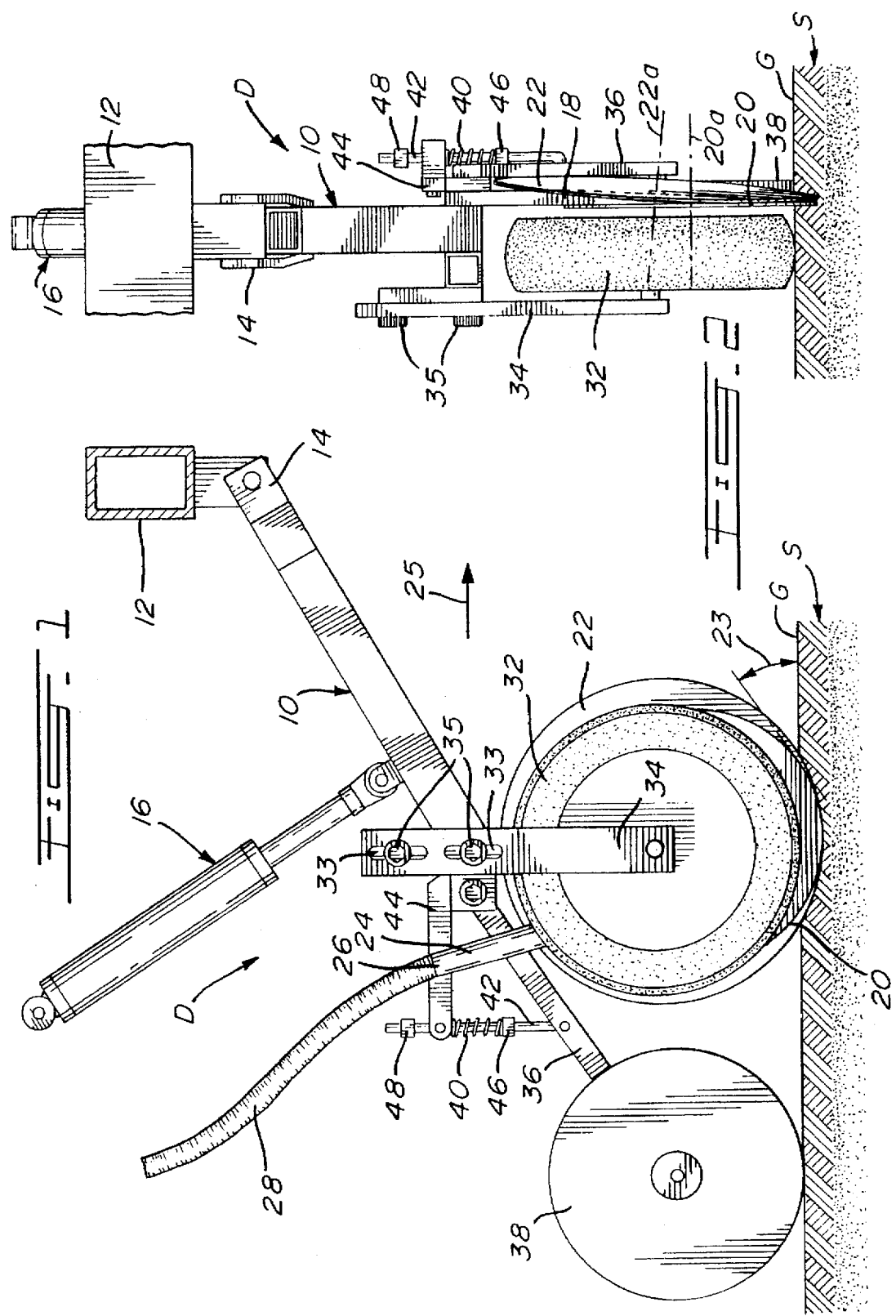

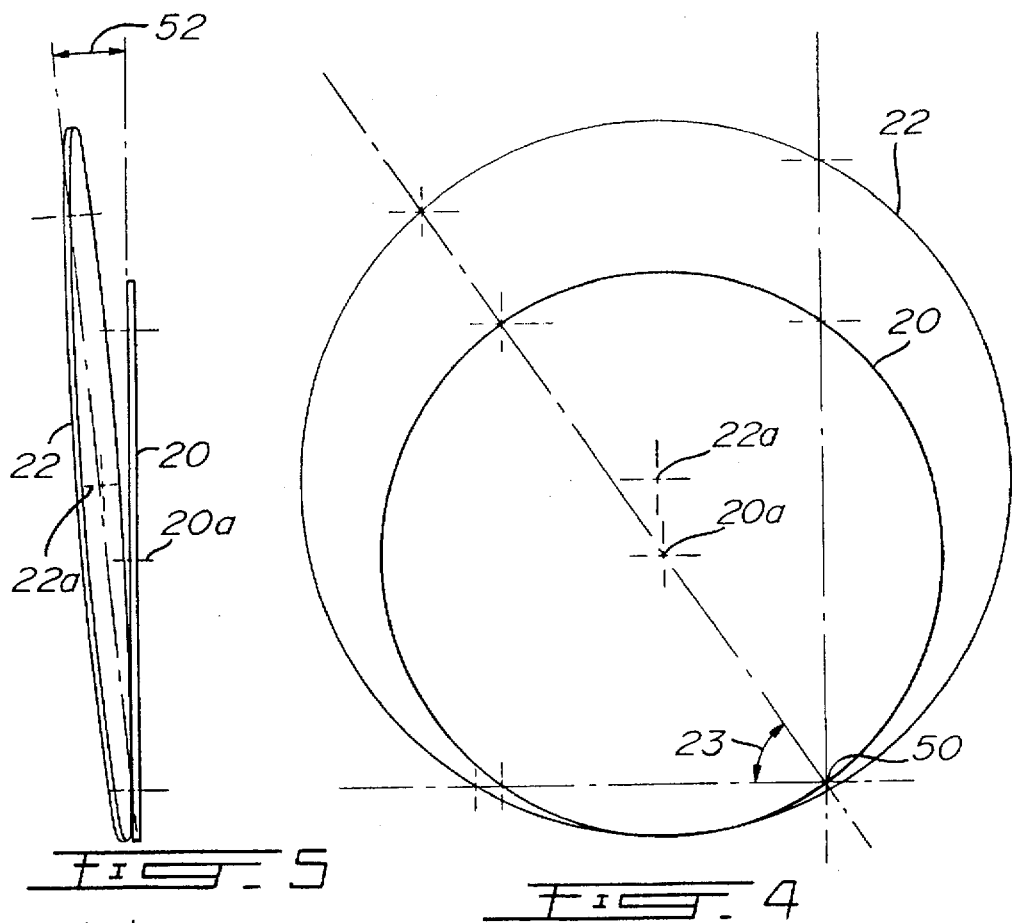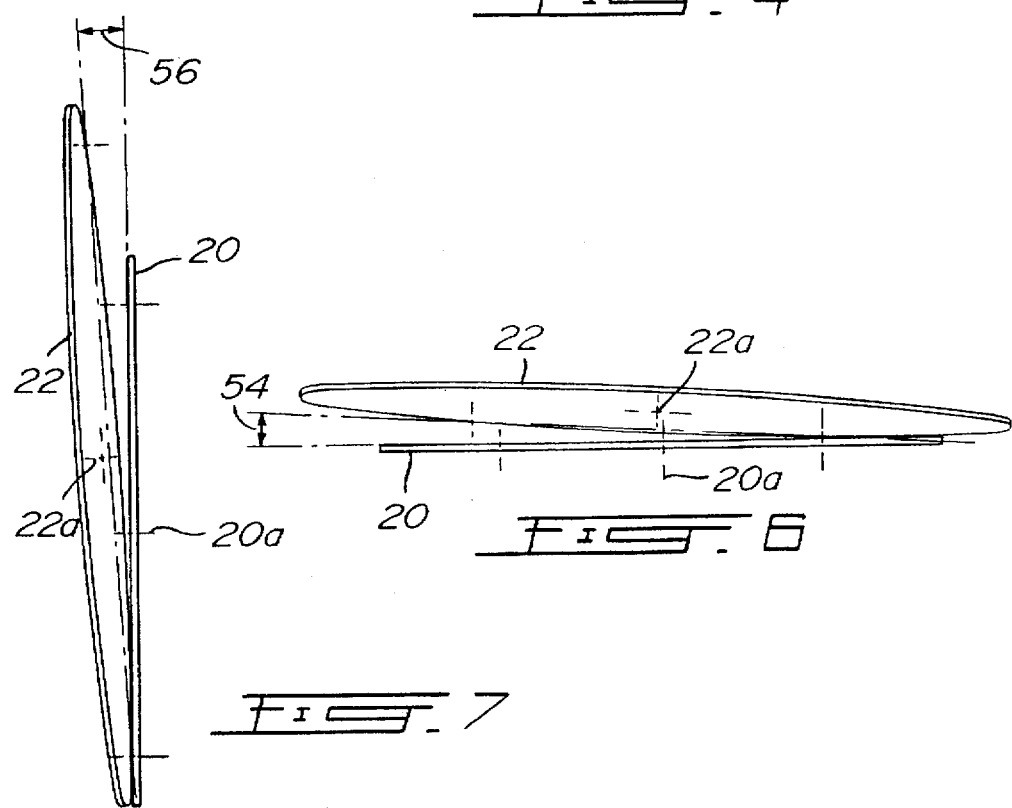

MINIMUM TILLAGE SEEDING DEVICE

BACKGROUND OF THE INVENTION

1. Field of the Invention

The present invention relates mainly to seeders or planters used in agricultural operations and, more particularly, to seeding tools adapted for no-tillage or minimum tillage seeding or planting of cereal crops and others.

2. Description of the Prior Art

The soil conditions which are encountered in no-tillage seeding are more particular due to the presence of crop residues at the ground surface. In no-tillage seeding, the soil is also more difficult to penetrate due to the absence of tillage prior to seeding.

No-tillage seeding also requires considerable seeding tool down pressure for ensuring the penetration of the seeding disk(s) in residue-covered soil with a view of producing the furrow openings in sometimes hard soils while maintaining proper seeding depth. Many existing seeders use a colter disk placed in front of a conventional double disk opener to first cut residues and open a trench in the soil. The double disk opener then has to follow in this same trench in order to open the furrow and place the seeds in the ground. At the rear of the opener, there is provided a press wheel which habitually also controls the depth of the seeding and which closes the furrow and packs the soil around the seeds. Seed placement cannot be precise by this "triple-disk" combination because of the close dependence between each component (colter, opener, press wheel) when traveling over the field. Uneven soil conditions typical of no-tillage seeding prevent the colter and the double disk from always working at the same depth to place seeds precisely in the ground. The firming by the press wheel of the soil over the seeds varies greatly in these conditions and also impedes, delays or reduces the subsequent emergence of the plants.

Hoe openers do not use disk blades for furrow opening. Seed placement is also imprecise with this kind of opener. Seed placement is done when the furrow is closing and trash plugging at the front of the hoe opener often represents a problem for soils having heavy residues at their surface. Soil disturbance is very high with the hoe opener and water movement or supply up to seed can considerably be reduced in dry conditions.

U.S. Pat. No. 4,760,806 issued on Aug. 2, 1988 to Bigbee et al. describes a seeding tool intended for conservation seeding. A single disk opener blade is rotatable about a rotation axis offset at an angle of approximately seven (7) degrees from an axis perpendicular to the direction of travel of the seeder for cutting residues and furrow opening. A seed boot is used to avoid soil backfilling during the placement of the seeds in the furrow. Trash plugging can occur on this seed boot when the seeding tool is used in heavy residue conditions due to the immobility of this component. A depth control wheel located on the side of the disk blade is also disposed at an angle which can thus cause more soil disturbance and brake down stubbles present at the ground surface. Both a press wheel and a closing wheel are used on this tool to obtain the seed-soil contact. The press wheel passes directly in the furrow behind the disk thereby causing the seeds to be removed from the furrow when the seeding tool is used in humid terrain. These two wheels also increase considerably the number of parts required to ensure proper operation of this system and thus the cost thereof. The mechanical complexity of the, depth control system also contributes to the cost of this seeding device.

U.S. Pat. No. 4,765,263 issued on Aug. 23, 1988 to Wilkins discloses a furrow opener using a hoe type furrow opener assembly operating along a translational displacement and comprising first and second blade-shaped furrow opening means for opening in the ground respectively a narrow furrow for receiving fertilizer and another furrow above the narrow furrow for receiving the seeds. The first opener is located below the second opener and the seeder is adapted in order that the lower furrow, once fertilizer has been delivered therein, is covered with soil before seeds are delivered in the upper furrow produced by the second opener.

U.S. Pat. No. 5,025,736 issued on Jun. 25, 1991 to Anderson discloses another furrow opener using a hoe type furrow opener mounted on a chisel plow shank instead of seeding disk(s) as in the Bigbee et al. Patent and as in the present invention.

SUMMARY OF THE INVENTION

It is therefore an aim of the present invention to provide an improved seeding device which uses disks to open a furrow for seed placement in the soil and which is mainly aimed at no-tillage or minimum tillage seeding.

In accordance with the present invention, there is provided a seeding device comprising frame means, furrow opener means mounted to the frame means for producing a furrow in soil when displaced in a direction of travel of said seeding device, delivery means for supplying at least one substance in the furrow, the furrow opener means comprising first and second disks adapted to be partly introduced in the soil, the first disk extending in a plane substantially parallel to the direction of travel of the seeding device, the first and second disks contacting one another at respective lower front portions thereof, the second disk extending slightly away from the first disk as the second disk extends substantially opposite the direction of travel, the first and second disks thus defining a substantially V-shaped configuration, the second disk being angled relative to the direction of travel for cutting through residues and the soil and for displacing a volume of soil to form the furrow while the first disk retains at least part of the soil so displaced on a side of the furrow, whereby the substance can be fed from the delivery means in the furrow at a desired depth.

In a more specific construction, the first disk is smaller than the second disk and extends substantially vertically, the second disk extending at a compound angle from the plane of the first disk, the first and second disks being rotatably mounted to the frame means and contacting one another at a lower front peripheral edge of the smaller disk and at least partly at or adjacent to a ground surface of the soil.

Furthermore, the seeding device comprises depth control means for maintaining substantially constant a depth of the furrow, and press wheel means for closing the furrow with soil previously disturbed by the furrow opener means once the substance has been deposited in the furrow.

The depth control means may comprise a wheel mounted to the frame means and on one side or in front of the furrow opener means, the furrow opener means extending lower than the wheel, the wheel and the furrow opener means being adapted for following in concert a ground surface of the soil thereby substantially ensuring a uniform furrow depth.

Adjustment means may be provided for varying a vertical position of the wheel relative to the frame means and thus to the furrow opener means, whereby a vertical distance between respective lower edges of the wheel and of the furrow opener means can be adjusted for obtaining various furrow depths.

The press wheel means may be biased by a spring means towards a ground surface of the soil for obtaining an appropriate compaction of the soil in the furrow and on the substance previously delivered therein. More specifically, a force of the spring means can be manually adjusted in order that the press wheel means can apply various forces on the soil.

Furthermore, the press wheel means is rotatably mounted to an arm means pivotally mounted to the frame means, the press wheel means being adapted to be positioned from a location directly over the furrow to a location along a side thereof while being positioned vertically or at an angle relative to the ground surface.

The delivery means may comprise a tube means extending from storage and distribution means for the substance to a space defined between the first and second disks. The tube means defines at a substance delivery end thereof an elongated cross-section for fitting in the space which is substantially narrow.

In another construction in accordance with the present invention, there is provided a furrow opener comprising first and second disks, the first disk extending in a plane substantially parallel to a direction of travel of the furrow opener, the first and second disks contacting one another at respective lower front portions thereof, the second disk extending slightly away from the first disk as the second disk extends forward substantially opposite the direction of travel, the first and second disks thus defining a substantially V-shaped configuration, the second disk being angled relative to the direction of travel for cutting through residues and the soil and for displacing a volume of soil to form a furrow.

More specifically, the first disk is smaller than the second disk and extends substantially vertically, the second disk extending at a compound angle from the plane of the first disk, the first disk being adapted for retaining at least part of the soil displaced by the second disk on a side of the furrow.

Also, the first and second disks contact one another at a contact area substantially located at respective lower front peripheral portions thereof.

Furthermore, the contact area is located at respective peripheral edges of the first and second disks and is further located at least partly below a ground surface of the soil.

Therefore, the present invention provides an improved seeding tool used principally in no-tillage seeding of cereal crops and others. Low soil disturbance and precise seed placement are achieved with the present seeding device thereby overcoming the disadvantages encountered with the other seeding tools which are available for providing substantially the same operation in the soil.

The no-tillage technique requires a specially designed device to place seed and/or fertilizer correctly, to create adequate seedbed conditions and for correct soil firming when compared to conventional methods. Plant emergence is highly dependent upon the performance of this device and each function has to be done precisely to optimize emergence and subsequent crop yields. The proposed seeding tool is designed to create a furrow by cutting and displacing a certain amount of soil and residues, to place seed and/or fertilizer inside this furrow while always maintaining it at a correct depth, and to provide the adequate seed-soil contact by packing the soil just around the seeds.

The invention first comprises a drag arm which links the rest of the seeding tool to a mainframe unit (seeder or planter). The drag arm transmits vertical and horizontal forces on the tool for good opening operation in variable soil conditions. The lower end of the drag arm serves to support the axes of first and second disks, the first disk rotating parallel to the drag arm while the larger second disk rotates at an angle relative to the direction of travel of the seeding device. The blades of these two disks are positioned to form a "V" shape opener having a contact point between the two disks located at 35° angle from the vertical axis. The larger disk is inclined to form an angle of 6° between this contact point and the larger disk's center, whereas the smaller disk is mounted vertically with no inclination. With this arrangement, the larger disk blade protrudes in front of the opener and the smaller disk follows at rear in the trench formed by the larger disk.

A seed tube is installed between both disks for seed or fertilizer transport and supply. The seed tube has a circular cross-section at the upper end thereof to easily fit with seed hoses and defines an elliptical cross-section at a lower end thereof to fit inside the narrow space defined between the two disks.

The main drag arm also supports a wheel placed on one side Of the disk opener or just in front thereof. This wheel follows the soil surface for maintaining the furrow opening disks at a constant depth in the soil. This depth control wheel can be adjusted by blocking it relatively to the supporting arm so that a given distance between the bottom edges of the disks and the depth control wheel's bottom surface is kept constant. In dry soil conditions, a depth control wheel positioned at the front of the opener allows seedbed conditioning due to the pressure applied on the soil by the depth control wheel.

A second arm is connected to the main supporting arm for supporting a press wheel assembly. Indeed, a lower end of this extended second arm supports a narrow wheel used for soil firming and furrow closing at the rear end of the seeding device. A spring is used in order that the press wheel can apply different pressures on the soil in a manner relatively independent from the soil conditions.

In operation, when the main supporting arm is rotated or pivoted downwards about the mainframe structure, the assembly is lowered whereby the present seeding tool engages the soil. A down pressure system applies the vertical force which is necessary for the opener to penetrate the soil. A horizontal (draft) force is transmitted via the supporting drag arm to allow for the displacement of the unit in the fields.

The furrow is formed when the larger disk blade penetrates and displaces the soil due to its angled setting or orientation. At the point of contact between the two disks, the second disk blade retains soil and residues on one side to allow for seeds to be delivered inside the furrow. The seeds are transported from a grain box and distribution devices down to the furrow via seed hoses and the seed tube extending downwards up to the gap defined between both disks. The seeds are deposited between the lower edges of both disks, these portions being in contact with the soil. The depth control wheel follows the soil surface in order that the furrow always maintains a uniform depth.

After the seeds and/or the fertilizer have been placed inside the furrow, the narrow press wheel which rotates over the displaced volume of soil applies a pressure to move this soil closely around the seeds. The extended arm can rotate freely about its linkage point located at the upper end thereof in a manner to allow the press wheel assembly to move independently of the main supporting arm and to thus follow the soil surface. The soil compressed around the seeds provides the required seed-soil contact necessary to have a complete and rapid plant emergence. Pressure distribution of the soil around the seed can be controlled by adjusting the pre-set compression of the spring and by changing the lateral position of the narrow press wheel on the lower end of the extended arm. This adjustment can be made in view of particular soil and field conditions.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a side elevational view shown partly in cross-section of a seeding device used for no-tillage or minimum seeding in accordance with the present invention and which is shown in operation in the soil;

FIG. 2 is a front elevational view of the seeding device shown in FIG. 1;

FIG. 4 is a schematic side elevational representation of a pair of seeding disks of the present seeding device;

FIG. 5 is a schematic rear elevational representation of the disks of FIG. 4 showing a compound angle defined by a larger one of the two disks; and FIGS. 6 and 7 are respectively top plan and rear elevational schematical representations of the disks of FIG. 4 Showing respectively horizontal and vertical projections of the compound angle FIG. 5.

DESCRIPTION OF THE PREFERRED EMBODIMENTS

Figure 3:
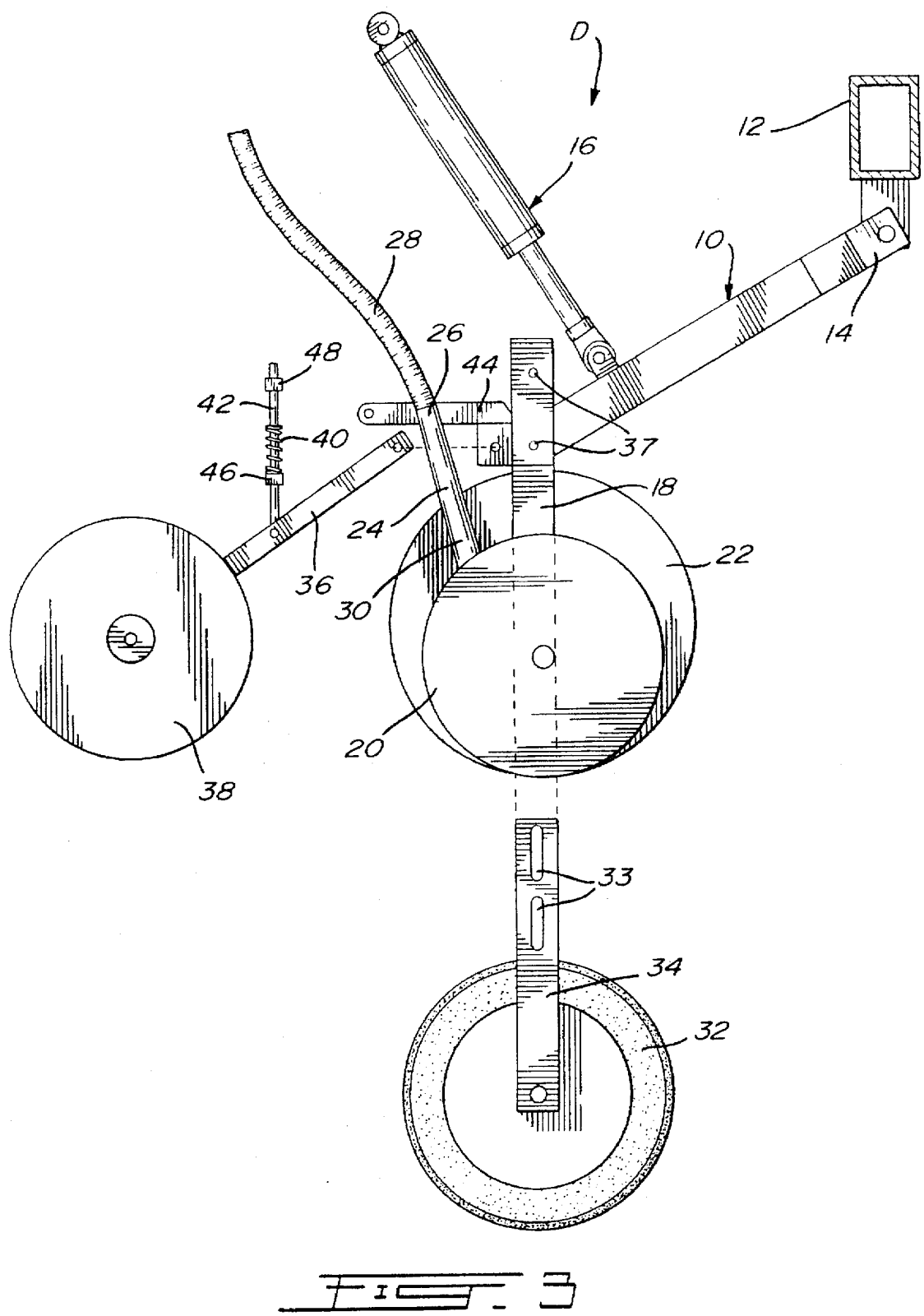
FIG. 3 is a partly exploded side elevational view of the present seeding device in which a depth control wheel and a press wheel assembly of the seeding device are drawn apart from the remainder of the device for better illustrating understanding the various components of the seeding device.

In accordance with the present invention, FIG. 1 is illustrates a seeding device D for no-tillage or minimum tillage seeding which comprises a drag arm 10 which links the rest of the seeding device D to a mainframe unit 12 (seeder or planter) with the drag arm 10 being pivotally mounted at an upper end 14 thereof to the mainframe unit 12. The operation of the drag arm 10, that is the raising and lowering thereof, can be controlled by an hydraulic cylinder 16 linking the drag arm 10 to the mainframe unit 12 (in a known manner not herein illustrated) or by any other weight transfer system able to transmit vertical and horizontal forces on the seeding tool for good furrow opening operation. A lower end member 18 of the drag arm 10 serves to support the axes rotation of first and second disks 20 and 22, respectively, which for instance have respective diameters of 14 and 18 inches. The two disks 20 and 22 are thus rotatably mounted to the lower end member 18 of the drag arm 10 about respective rotation axes 20a and 22a. The first disk 20 is mounted to rotate parallel to the drag arm 10 and thus in a vertical plane parallel to the direction of travel of the seeding device D as indicated by arrow in FIG. 1, whereas the second larger disk 22 is adapted to rotate in a plane defining an angle relative to the direction of travel of the seeding device D and to the vertical axis, i.e. to a horizontal plane.

The two disk blades 20 and 22 are positioned to form a "V" shape furrow opener with a contact point between the disks 20 and 22 being located substantially at an angle of 35° from the vertical axis, that is the angle between a ground or soil surface G and a tangent to the smaller disk 20 extending at the point of contact of the two disks 20 and 22 is approximately 35° (see angle 23 on FIG. 1). The smaller disk 20 is mounted vertically with no inclination, that is in a vertical plane parallel to the direction of travel. The larger disk 22 is inclined 6° along an axis extending through the contact point and the larger disk's center to thus form a compound angle in both the vertical and horizontal planes. This angle is defined between a line extending through the contact point and the attachment point of the larger disk 22 on its axis 22a and a line extending through the contact point and the real center of the larger disk 22. The vertical projection of this angle would produce an angle of approximately 5°, whereas a horizontal projection thereof would yield an angle of approximately 3°. With this arrangement, the larger disk 22 is located in front of the "V" opener and the smaller disk 20 follows behind the large disk 22 in the trench formed by this larger disk 22. The two disks 20 and 22 rotate on ball bearing supports at their center to prevent wear and to have a better cutting action on the soil. The tangency or contact point of the two disks 20 and 22 is located approximately 1.25 inch above the lower edges of the disks 20 and 22, and is thus located at the soil surface G when the seeding tool D is operated at a planting depth of 1.25 inch.

A seed tube 24 is installed between both disks 20 and 22 for seed or fertilizer delivery to the furrow. The seed tube 24 has a circular cross-section at an upper end 26 thereof in order that it can be connected to seed hoses 28 and defines an elliptical cross-section at a lower end 30 thereof so as to fit inside the narrow space provided between the two disks 20 and 22.

A support bracket 34 adjustably secured to the main drag arm 10 supports a wheel 32 placed on one side of the disk opener (i.e. the assembly of the two disks 20 and 22) or just in front thereof. The height of the wheel 32 relative to the drag arm 10 and thus to the disks 20 and 22 can be varied by way of vertically oriented oblong openings 33 defined in the support bracket 34 and bolts 35 engageable in holes 37 provided in the drag arm 10. The wheel 32 follows the soil surface G for maintaining the opener disks 20 and 22 at a constant depth in the soil S. The depth control wheel 32 can be adjusted by blocking its support bracket 34 relatively to the drag arm 10 so that given distances between the bottom edges of the disks 20 and 22 and the bottom edge of the depth control wheel 32 are kept constant.

A second arm 36 which is pivotally connected to the main supporting arm 10 carries a press wheel assembly. At a lower trailing end of the extended second arm 36, there is rotatably mounted a narrow steel wheel 38, that is a press wheel, which is used for soil firming and furrow closing at the rear end of the seeding device D. A compressed spring 40 is used in order that the press wheel 38 can apply pressure on the soil S. The spring 40 is positioned over a rod 42 which links the extended arm 36 to a trailing section 44 of the main supporting arm 10. A nut 46 (or the like) is longitudinally adjustable along the rod 42 in order to compress further or partially release the spring 40 so that the press wheel 38 may apply different pressures on the soil S. The rod 42 is pivotally mounted at a lower end thereof to the extended arm 36 and extends through a sleeve or the like (not shown) pivotally mounted to the rear end of the trailing section 44 of the drag arm 10 in order to allow a relative pivot of the extended arm 36 with respect to the drag arm 10. A stopper 48 is provided on the rod 42 above the trailing section 44 to limit the downward displacement of the press wheel 38 with respect to the trailing section 44. Therefore, the rod 42 and the stopper 48 serve to retain the press wheel 38 when the seeding tool D is lifted for transport.

For using the seeding device D, the drag arm 10 is rotated downwards with respect to the mainframe unit 12 by way of the hydraulic cylinder 16 so as to cause the engagement of the seeding device D and, more particularly, the opener disks 20 and 22 in the soil S. The hydraulic cylinder 16 acts as a down pressure system to apply the vertical force necessary for the penetration of the "V" opener in the soil S. The horizontal (draft) force is transmitted via the supporting drag arm 10 to allow for system displacement in the fields.

The furrow is formed in the soil S when the larger disk blade 22 penetrates and displaces the soil S due to its angled configuration. At the point of contact between the two disks 20 and 22, the smaller disk blade 20 retains soil and residues on one side to allow the seeds delivered by the seed tube 24 to reach the furrow. The seeds are transported from a grain box and distribution devices provided possibly on the mainframe unit 12 down to the furrow via the seed hoses 28 and the seed tube 24 arrangement extending between both disks 20 and 22. The seeds are deposited between the lower edges of both disks 20 and 22 which are in contact with the soil S. The depth control wheel 32 follows the soil surface G for always producing a furrow of uniform depth.

After the seeds and/or fertilizer have been laid in the furrow, the narrow press wheel 38 which rotates over the displaced volume of soil applies a pressure to move such volume of soil closely around the seeds and/or fertilizer. The extended arm 36 can rotate freely about its linkage point with the drag arm 10 at the upper end of the extended arm 36 in such a way manner so as to allow the press wheel assembly to move independently the main supporting arm 10 and to thus follow the soil surface G. The soil compressed around the seeds provides the required seed-soil contact necessary to obtain a complete and rapid plant emergence. The pressure distribution of the backfilled soil around the seeds in the furrow can be controlled by adjusting the pre-set compression of the spring 40 and by changing the lateral position of the narrow press wheel 38 on the lower trailing end of the extended arm 36. Different compaction patterns between seed and soil can thus be obtained by positioning the press wheel 38 directly over the furrow or along its side, vertically or at an angle. These adjustments are made on the basis of the soil and field conditions of a particular seeding application.

FIGS. 4 to 7 better illustrate the relative position of the two disks 20 and 22 and, more particularly, the aforementioned compound angle of approximately 6° and the horizontal and vertical projections thereof of approximately 3° and 5°, respectively. In FIG. 4, reference numeral 50 represents the contact point on the smaller disk 20 of the two disks 20 and 22, a tangent to this point 50 defining the aforementioned angle 23 of 35°. In FIG. 5, there is represented at reference numeral 52 the compound angle of approximately 6° defined by the larger disk 22. FIG. 6 shows a horizontal projection 54 having an approximate angle of 3° of the compound angle 52 of FIG. 5, whereas FIG. 7 shows at reference numeral 56 a vertical projection of approximately 5° of the compound angle 52.

The present seeding device D Can also be used to place granular fertilizer in band.

I claim:

1. A minimum-tillage seeding device comprising frame means, furrow opener means mounted to said frame means for producing a furrow in soil when displaced in a direction of travel of said seeding device, delivery means for supplying at least one substance in the furrow, said furrow opener means comprising first and second disks adapted to be partly introduced in the soil, said first disk being smaller than said second disk and extending in a substantially vertical plane which is substantially parallel to said direction of travel of said seeding device, said first and second disks contacting one another at respective lower front portions thereof, said second disk extending in a non vertical plane and away from said first disk as said second disk extends both rearwardly and upwardly from said lower front portions, said first and second disks thus defining a substantially V-shaped configuration when viewed from said direction of travel, said second disk being angled relative to said direction of travel for cutting through residues and the soil and for displacing a volume of soil to form the furrow while said first disk retains at least part of the soil so displaced on a side of the furrow, whereby the substance can be fed from said delivery means in the furrow at a desired depth.

2. A seeding device as defined in claim 1, wherein said second disk extends at a compound angle from said plane of said, first disk, and wherein said first and second disks are substantially flat and extend to substantially a same depth in the soil.

3. A seeding device as defined in claim 2, wherein said first and second disks are rotatably mounted to said frame means and contact one another at a contact area substantially located at respective lower front peripheral portions thereof, said contact area being located at least partly at or adjacent to a ground surface of the soil, said second disk extending forward more than said first disk.

4. A seeding device as defined in claim 3, wherein said first disk contacts said second disk at a peripheral edge of said first disk.

5. A seeding device as defined in claim 2, wherein said first and second disks have respectively diameters of approximately 14 and 18 inches, said first and second disks contacting one another at a contact area substantially located at respective peripheral portions thereof, said contact area being located approximately 1.25 inch above lower edges of said first and second disks, a tangent to said first disk at said contact area defining with respect to a general plane of the soil an angle of approximately 35°, an axis extending through said contact area and a center of said second disk defining a compound angle of approximately 6°.

6. A seeding device as defined in claim 1, wherein said device further comprises depth control means for maintaining substantially constant a depth of the furrow.

7. A seeding device as defined in claim 6, wherein said depth control means comprises a wheel mounted to said frame means and on one side or in front of said furrow opener means, said furrow opener means extending lower than said wheel, said wheel and said furrow opener means being adapted for following in concert a ground surface of the soil thereby substantially ensuring a uniform furrow depth.

8. A seeding device as defined in claim 7, wherein said frame means is pivotally mounted to a mainframe unit and is supported by said wheel displacing on the ground surface, whereby said wheel, said frame means and said furrow opener means all follow terrain fluctuations in such a way that the furrow has a substantially uniform depth, and wherein adjustment means are provided for varying a vertical position of said wheel relative to said frame means and thus to said furrow opener means, whereby a vertical distance between respective lower edges of said wheel and of said furrow opener means can be adjusted for obtaining various furrow depths.

9. A seeding device as defined in claim 1, wherein said device further comprises press wheel means for closing the furrow with soil previously disturbed by said furrow opener means once the substance has been deposited in the furrow.

10. A seeding device as defined in claim 9, wherein said press wheel means is biased by a spring means towards a ground surface of the soil for obtaining an appropriate compaction of the soil in the furrow and on the substance previously delivered therein, and wherein a force of said spring means can be selectively adjusted in order that said press wheel means can apply various forces on the soil.

11. A seeding device as defined in claim 10, wherein said press wheel means is rotatably mounted to an arm means pivotally mounted to said frame means, said press wheel means being adapted to be positioned from a location directly over the furrow to a location along a side thereof while being positioned vertically or at an angle relative to the ground surface.

12. A seeding device as defined in claim 1, wherein said frame means is pivotally mounted to a mainframe unit with a hydraulic cylinder being provided for lowering and raising said frame means and thus said furrow opener means and for transmitting the required forces to said furrow opener means.

13. A seeding device as defined in claim 1, wherein said delivery means comprises a tube means extending from means for storing and distributing the substance to a space defined between said first and second disks and located rearward of said lower front portions of said first and second disks.

14. A minimum-tillage furrow opener comprising first and second disks, said first disk being smaller than said second disk and extending in a substantially vertical plane which is substantially parallel to a direction of travel of said furrow opener, said first and second disks contacting one another at respective lower front portions thereof, said second disk extending in a non vertical plane and away from said first disk as said second disk extends both rearwardly and upwardly from said lower front portions, said first and second disks thus defining a substantially V-shaped configuration when viewed from said direction of travel, said second disk being angled relative to said direction of travel for cutting through residues and the soil and for displacing a volume of soil to form a furrow.

15. A furrow opener as defined in claim 14, wherein said second disk extends at a compound angle from said plane of sad first disk, said first and second disks being substantially flat and contacting one another at a contact area substantially located at respective lower front peripheral portions thereof, said first disk being adapted for retaining at least part of the soil displaced by said second disk on a side of the furrow.

16. A furrow opener as defined in claim 15, wherein said contact area is located at respective peripheral edges of said first and second disks and is further located at least partly at or adjacent to a ground surface of the soil, and wherein said first and second disks extend to substantially a same depth in the soil.

17. A furrow opener as defined in claim 15, wherein said first and second disks have respectively diameters of approximately 14 and 18 inches, said first and second disks contacting one another at a contact area substantially located at respective peripheral portions thereof, said contact area being located approximately 1.25 inch above lower edges of said first and second disks, a tangent to said first disk at said contact area defining with respect to a general plane of the soil an angle of approximately 35°, an axis extending through said contact area and a center of said second disk defining a compound angle of approximately 6°.

18. A minimum-tillage furrow opener comprising first and second disks, said first disk being smaller than said second disk and extending in a substantially vertical plane which is substantially parallel to a direction of travel of said furrow opener, said first and second disks contacting one another at respective lower front portions thereof and extending to substantially a same depth in the soil, said second disk being angled relative to said first disk such that said first and second disks define a substantially V-shaped configurations when viewed from said direction of travel with said second disk being adapted to cut through residues and through the soil and to displace a volume of soil to form a furrow.

19. A furrow opener as defined in claim 18, wherein said second disk extends at a compound angle from said plane of said first disk, said first and second disks being substantially flat and contacting one another at a contact area substantially located at respective lower front peripheral portions thereof, said first disk being adapted for retaining at least part of the soil displaced by said second disk on a side of the furrow, said contact area being located at respective peripheral edges of said first and second disks and at least partly at or adjacent to a ground surface of the soil.

20. A furrow opener as defined in claim 19, wherein said first and second disks have respectively diameters of approximately 14 and 18 inches, said first and second disks contacting one another at a contact area substantially located at respective peripheral portions thereof, said contact area being located approximately 1.25 inch above lower edges of said first and second disks, a tangent to said first disk at said contact area defining with respect to a general plane of the soil an angle of approximately 35°, an axis extending through said contact area and a center of said second disk defining a compound angle of approximately 6°.

* * * * *